UNITED STATES PATENT OFFICE.

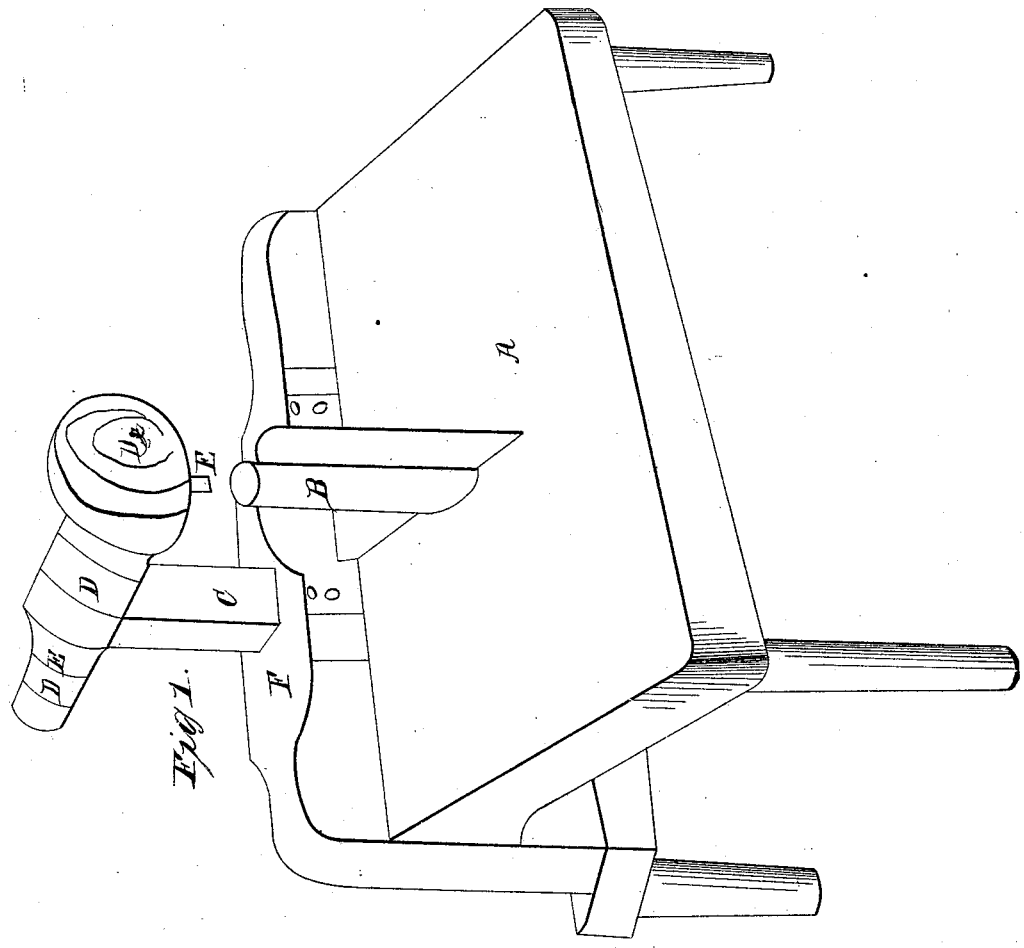

JAMES SETH TRIPP, OF DANBY, NEW YORK.

IMPROVED APPLE CORER AND QUARTERER.

Specification forming part of Letters Patent No. 44,239, dated September 13, 1864.

*To all whom it may concern:*

Be it known that I, JAMES S. TRIPP, of the town of Danby, in the county of Tompkins and State of New York, have invented a machine for qu irtering and coring apples and extracting the pits or stones of fruit; and I do hereby declare that the following is a full and exact description thereof, reference being had to the annexed drawing, and to the letters of reference marked thereon, in which—

Figure 1 is a perspective view of my machine.

In it A is an inclined table that receives and slides away from the divider the quarters of the apples or other fruit. B is the quarterer and corer, made in the usual manner, with four or more wings for the lateral dividing of the fruit, and a circular center for removing the core or pit. C is a pitman that plays in a mortise through the cap-piece F, and has on its lower portion a spring that retracts the handle from the quarterer and corer. D is the handle and presser, so shaped at the end D e as to serve as a handle, and on the lower side of the end D x as a presser to force the fruit through the machine, and also to receive on its upper part a pat or push of the hand in forcing the fruit downward. F is a pin that steadies the upper part of the fruit. Still further to aid the complete dividing or cutting of the fruit, the space about the pin F is excavated, so as to fully fit the divider and corer B.

The use of the machine is apparent to those skilled in the art to which it appertains—to be that the fruit is placed on the top of the divider, and by a presure on the handles the fruit is instantly divided and cored, the cores going beneath the table, and the quarters sliding to the front of the table; the same of fruit with pits.

I claim—

The combination of the inclined table A, the cap F, the pitman C and its spring, the horizontal handle and fruit-presser D, and pin E, made and operating as described.

Ithaca, February 8, 1864.

JAMES SETH TRIPP.

Witnesses:
SAMUEL J. PARKER,
JOHN R. BALDWIN.